(No Model.) 8 Sheets—Sheet 1.

J. W. RAMSDEN & H. S. ELLIS.
SEWING MACHINE.

No. 467,136. Patented Jan. 12, 1892.

FIG. 1.

Witnesses.
Thos. E. Craven.
William Sadler

Inventors.
John William Ramsden
Harry Senior Ellis (No Model.) 8 Sheets—Sheet 2.
J. W. RAMSDEN & H. S. ELLIS.
SEWING MACHINE.

No. 467,136. Patented Jan. 12, 1892.

Witnesses
Inventors.

(No Model.) 8 Sheets—Sheet 3.

J. W. RAMSDEN & H. S. ELLIS.
SEWING MACHINE.

No. 467,136. Patented Jan. 12, 1892.

Witnesses.
Inventors
John William Ramsden
Harry Senior Ellis.

(No Model.)  8 Sheets—Sheet 4.

J. W. RAMSDEN & H. S. ELLIS.
SEWING MACHINE.

No. 467,136.  Patented Jan. 12, 1892.

Witnesses.
Thos. E. Craven.
William Sadler

Inventors:
John William Ramsden
Harry Senior Ellis (No Model.) 8 Sheets—Sheet 6.
J. W. RAMSDEN & H. S. ELLIS.
SEWING MACHINE.
No. 467,136. Patented Jan. 12, 1892.
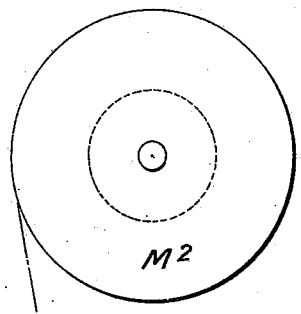
FIG. 6.
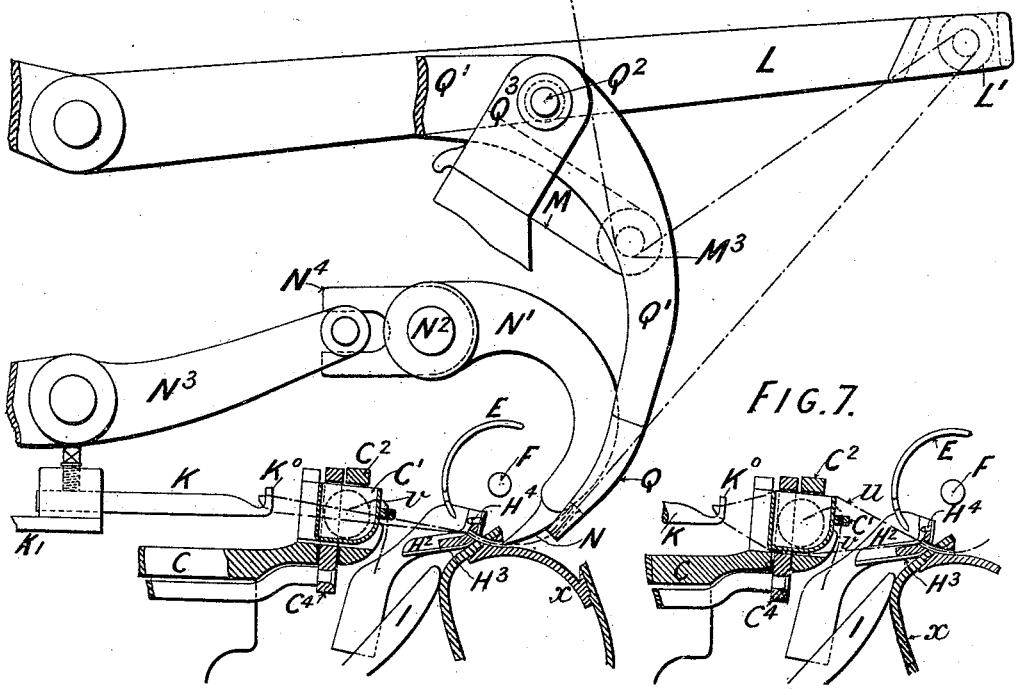
Witnesses.
Thos. E. Craven. Fel. Inst. P.A.
William Sadler
Inventors.
John William Ramsden
Harry Senior Ellis.

(No Model.) 8 Sheets—Sheet 7.
J. W. RAMSDEN & H. S. ELLIS.
SEWING MACHINE.
No. 467,136. Patented Jan. 12, 1892.
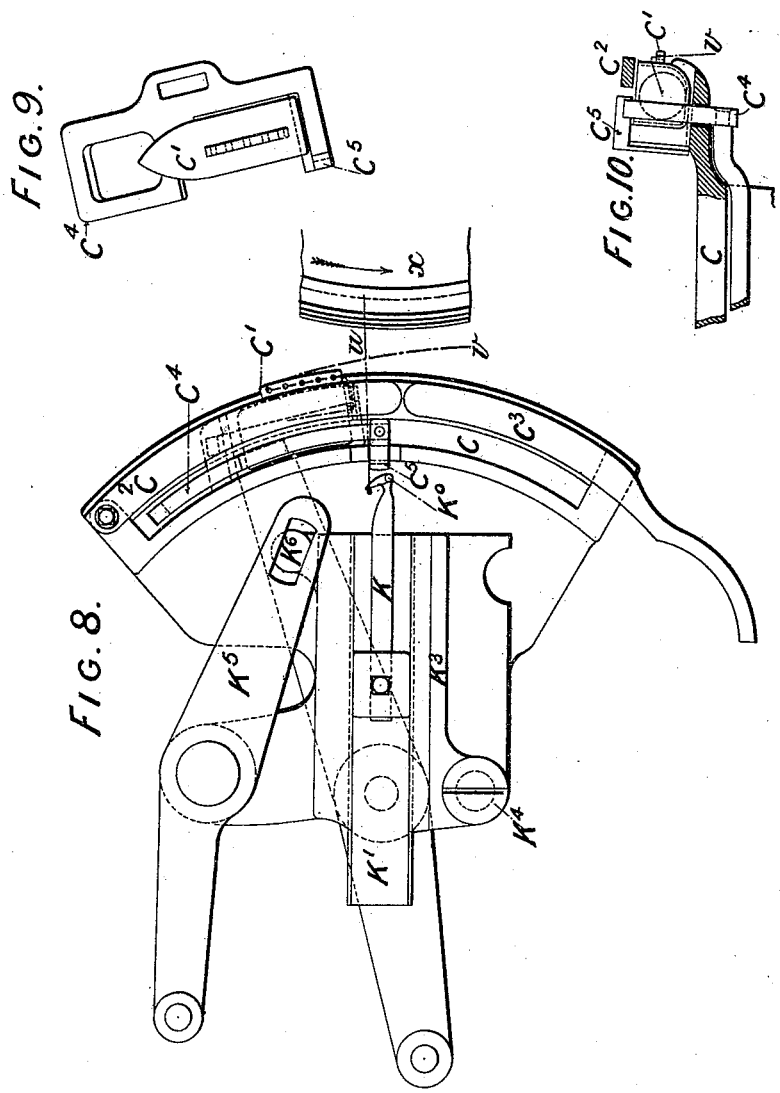

(No Model.) 8 Sheets—Sheet 8.

J. W. RAMSDEN & H. S. ELLIS.
SEWING MACHINE.

No. 467,136. Patented Jan. 12, 1892.

Witnesses.
Thos. E. Craven. (Fel. Inst. P. A.)
William Sadler

Inventors.
John William Ramsden
Harry Senior Ellis

UNITED STATES PATENT OFFICE.

JOHN WILLIAM RAMSDEN AND HARRY SENIOR ELLIS, OF LEEDS, ENGLAND.

SEWING-MACHINE.

SPECIFICATION forming part of Letters Patent No. 467,136, dated January 12, 1892.

Application filed July 23, 1889. Serial No. 318,353. (No model.) Patented in England February 7, 1889, No. 2,192.

*To all whom it may concern:*

Be it known that we, JOHN WILLIAM RAMSDEN and HARRY SENIOR ELLIS, engineers, subjects of the Queen of Great Britain and Ireland, residing at Leeds, in the county of York, Kingdom of Great Britain and Ireland, have invented new and useful Improvements in Sewing-Machines, (patented in England February 7, 1889, No. 2,192,) of which the following is a specification.

In the specification of Letters Patent granted to us, No. 357,334, dated February 8, 1887, are described certain improvements in sewing-machines of the kind in which two waxed threads are used by means of a curved hooked needle and a shuttle operating above the work or material to be sewed and adapted for the manufacture of welted boots and pumps or turn-shoes.

Our present invention relates to further improvements in such machines, part of which consists in the arrangement of the shuttle and the curvilinear race in which it travels behind instead of above the work, as heretofore, thus offering better facilities for the manipulation of the work under treatment.

In the annexed drawings, Figure 1 is a side elevation, Fig. 2 is a plan, and Fig. 3 a front elevation, of a sewing-machine in accordance with our invention. Figs. 4 to 12, both inclusive, illustrate to a large scale various details of the machine, such figures being hereinafter more specifically referred to.

Similar letters and numerals indicate like parts throughout all the figures.

A is the standard, (in part,) upon which the machine is mounted.

B is the head-stock of the machine.

C is the curved shuttle-race, (shown in section in Fig. 1,) and C' the shuttle.

$C^2$ and $C^3$ are guards over the race to prevent the shuttle from leaping during its movement.

$C^4$ is the shuttle-driver, and $C^5$ a finger thereon by which the loop of thread is stripped from the hook K.

D is the main or driving shaft, upon which the cams for actuating the various mechanisms are mounted.

E is the curved hooked needle, which, together with its carrier, is mounted upon the fixed stud F and actuated by the cam $a$, lever G, with its toothed sector G', intermediate wheel $G^2$ on the axle $G^3$, on the other end of which is a corresponding wheel $G^4$, taking into the pinion or sector $G^5$ on the needle-carrier $G^6$, to which is attached the needle guide or stay $G^7$ for supporting the needle while entering the work.

H is the welt-guide lever; H', its center of motion; $H^2$, the welt-guide, and $H^3$ the guard-plate, with its finger or pin $H^4$ attached to the welt-guide. These are connected to the slide $H^5$ I is the boot-guide connected to the slide I'. This slide and the slide $H^5$ are mounted side by side in the head-stock B and actuated or controlled in the direction of the arrow $I^2$ by springs $I^3$, (one to each,) and are simultaneously locked by the lever J during the backward stroke of the needle and the drawing of the thread through the work and afterward released by the cam $d$, acting on the locking-lever J, so as to admit of the placing of a boot into position for being operated upon and of every part of its variable figure being presented to the proper action of the needle.

K is the reciprocating hook, with the projecting pin or fence $K^0$ for taking the loop from the needle and drawing it farther through the work and across the shuttle-race, and is actuated by the cam $e$ and bell-crank lever $K^2$, as previously mentioned.

The part $K^3$, carrying the slide K', in which the hook K is fixed, is mounted upon the center at $K^4$ and is actuated laterally for stripping the loop from the hook K by the cam $f$ and lever $K^5$, the latter taking on the stud $K^6$ of the part $K^3$.

L is the stitch-tightening lever, actuated by the cam $j$.

M is an arm carried by the swiveling fork $Q^3$ and rendered somewhat elastic by the spring M', its function being to take up "slack" in the looper-thread $u$ as it passes from the reel $M^2$ around the pulley $M^3$, then over the pulley L' of the stitch-tightening lever L to the looper Q.

N is the feeding-pricker, carried by the lever N', mounted on the axle $N^2$ and actuated by the cam $h$ through the lever $N^3$ in connection with the lever $N^4$ on the axle $N^2$. A sidewise action is imparted to this axle and the pricker equal to the required pitch or length of the stitches when the pricker is in the channel of the insole by means of the cam $i$ and lever O on the fulcrum-stud $o'$, such endwise action being variable by changing the position of the stud $o'$.

P is the pressure-foot, carried by the lever P′ and actuated by the cam $g$ on the periphery of the cam $f$.

Q is the looper, carried by the lever Q′, mounted on the axis $Q^2$ in the swiveling fork $Q^3$, whose swiveling axis is $Q^4$. The lever Q′ is actuated on the axis $Q^2$ (in an angular direction) by the cam $b$ and sidewise on the axis $Q^4$ of the swiveling fork by the grooved cam $b'$. These combined or compound motions cause the looper to approach and move around the point of the needle when it has made its forward stroke through the work and to place the looper-thread $u$ into the hook thereof, after which the looper retires to the position shown in Figs. 5 and 6.

Fig. 6 shows the hook K in its backward position, with the looped thread $u$ drawn farther through the material $x$ and across the path of the shuttle C′, the stitch-tightening lever L having been moved to a position nearer the work to give out sufficient thread in addition to a portion from the reel for this purpose.

Fig. 7 shows the shuttle C′ within the loop $u$ placing the locking-thread $v$ from the cop within it into the loop, after which the shuttle C′ completes its forward stroke and also a slight retrograde movement to allow the loop to pass over its rear end, and by the lateral movement of the hook K to become stripped therefrom by the stripping-finger $C^5$ on the shuttle-driver $C^4$.

Fig. 8 is a plan of the curved shuttle-race C′ and slide K′, carrying the hook K, and shows the shuttle C′ through the loop $u$ and the said loop in the act of being stripped from the hook K by the stripping-finger $C^5$ on the shuttle-driver $C^4$, after which the stitch-tightening lever L draws back the loop $u$ and completes the stitch.

Figs. 9 and 10 show detached views of the shuttle-driver $C^4$, the shuttle C′ within it, and the stripping-finger $C^5$, attached to the said driver.

Figure 2:
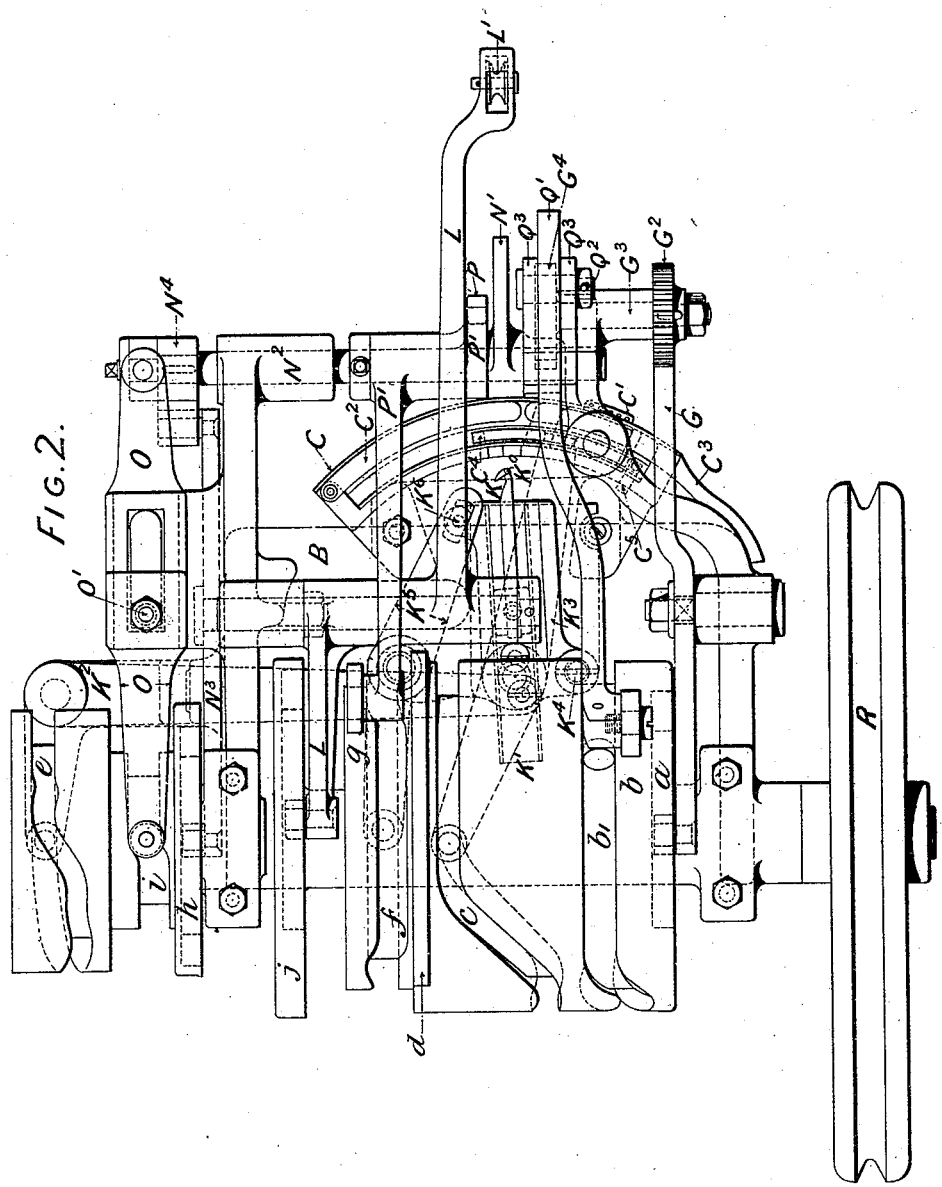
Figure 3:
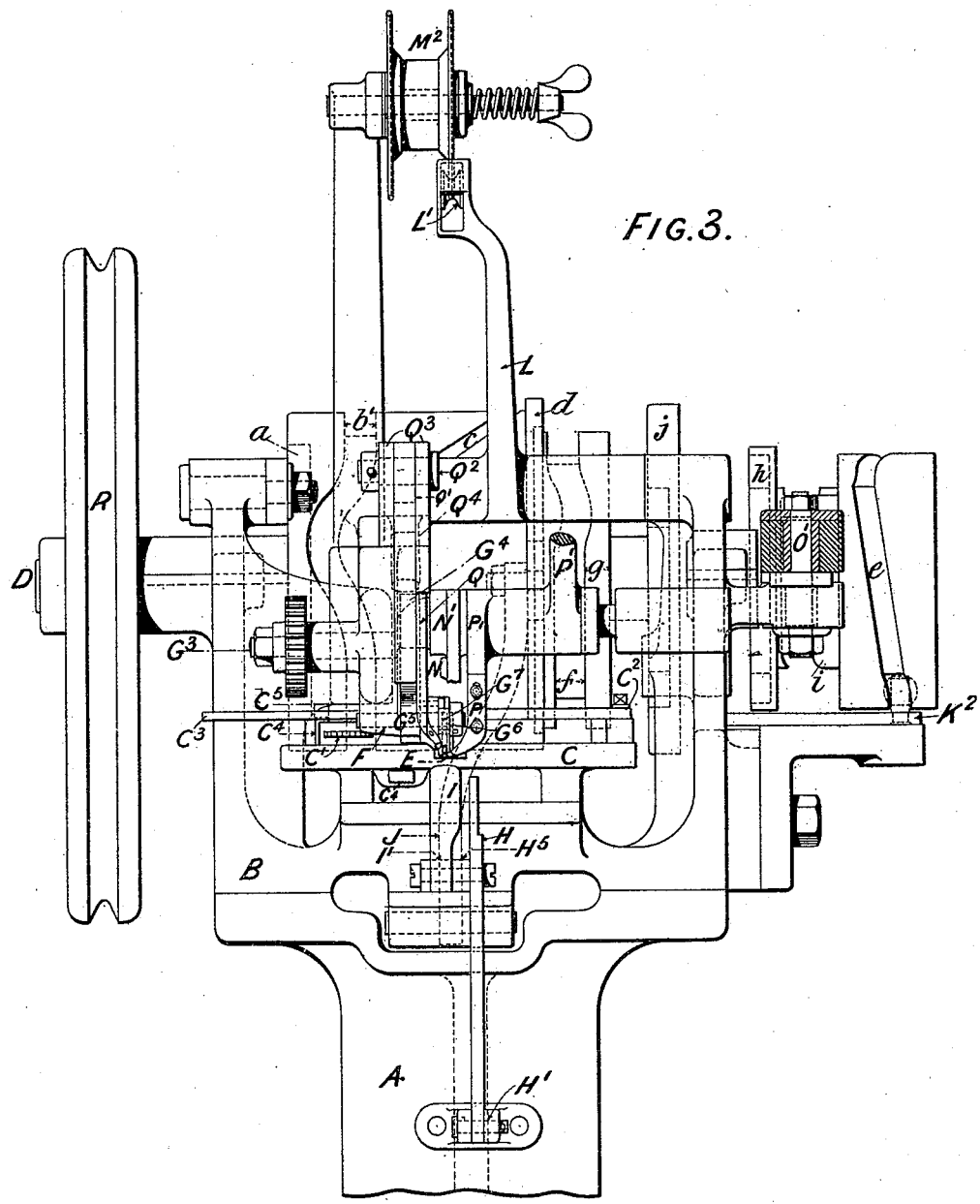
Figure 4:
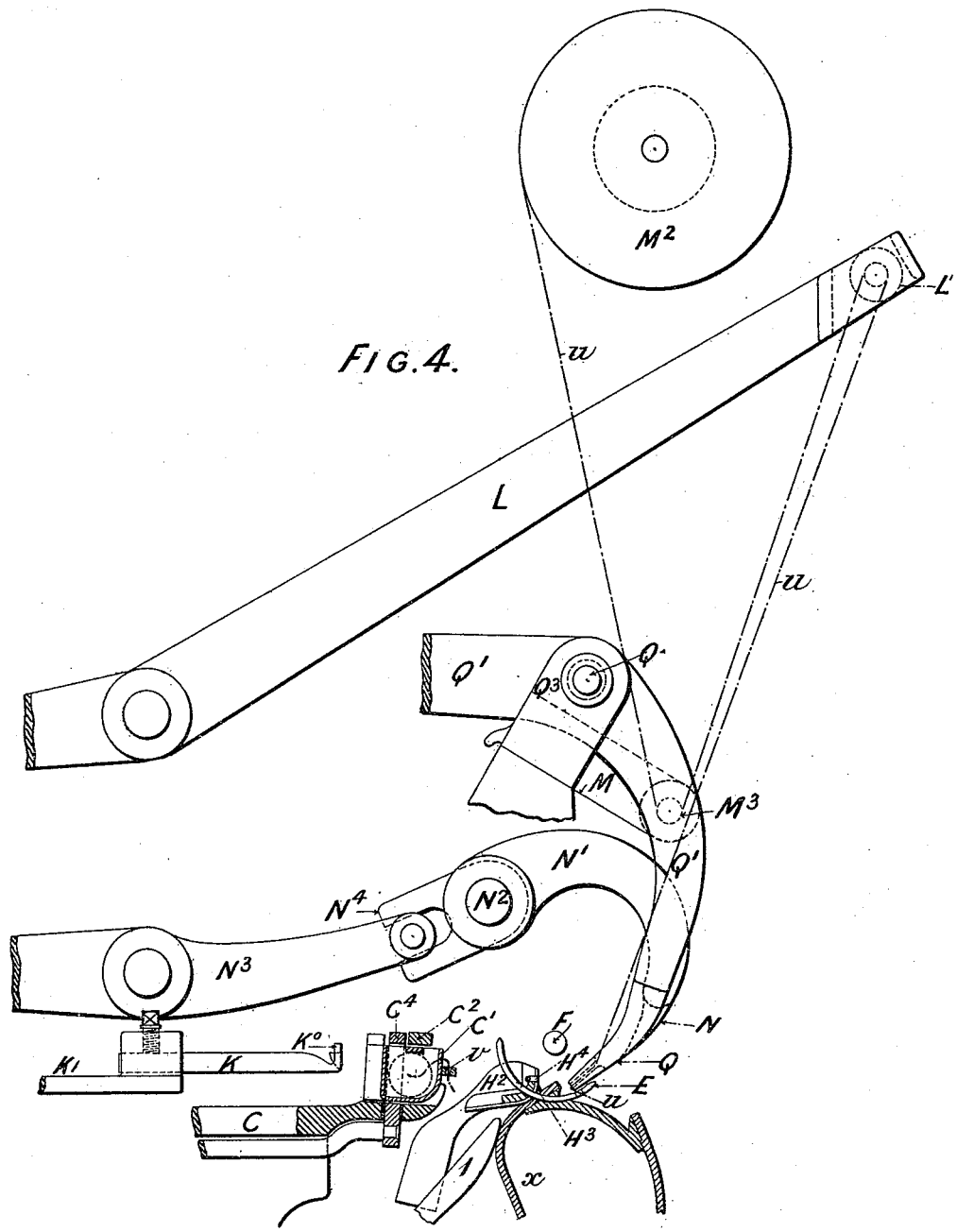
Fig. 4 shows the curved hooked needle E having passed through the material or boot $x$, with the looper Q in the act of placing the thread $u$ into the hook of the needle E, and the feeding-pricker N out of the way to admit of this.
Figure 5:
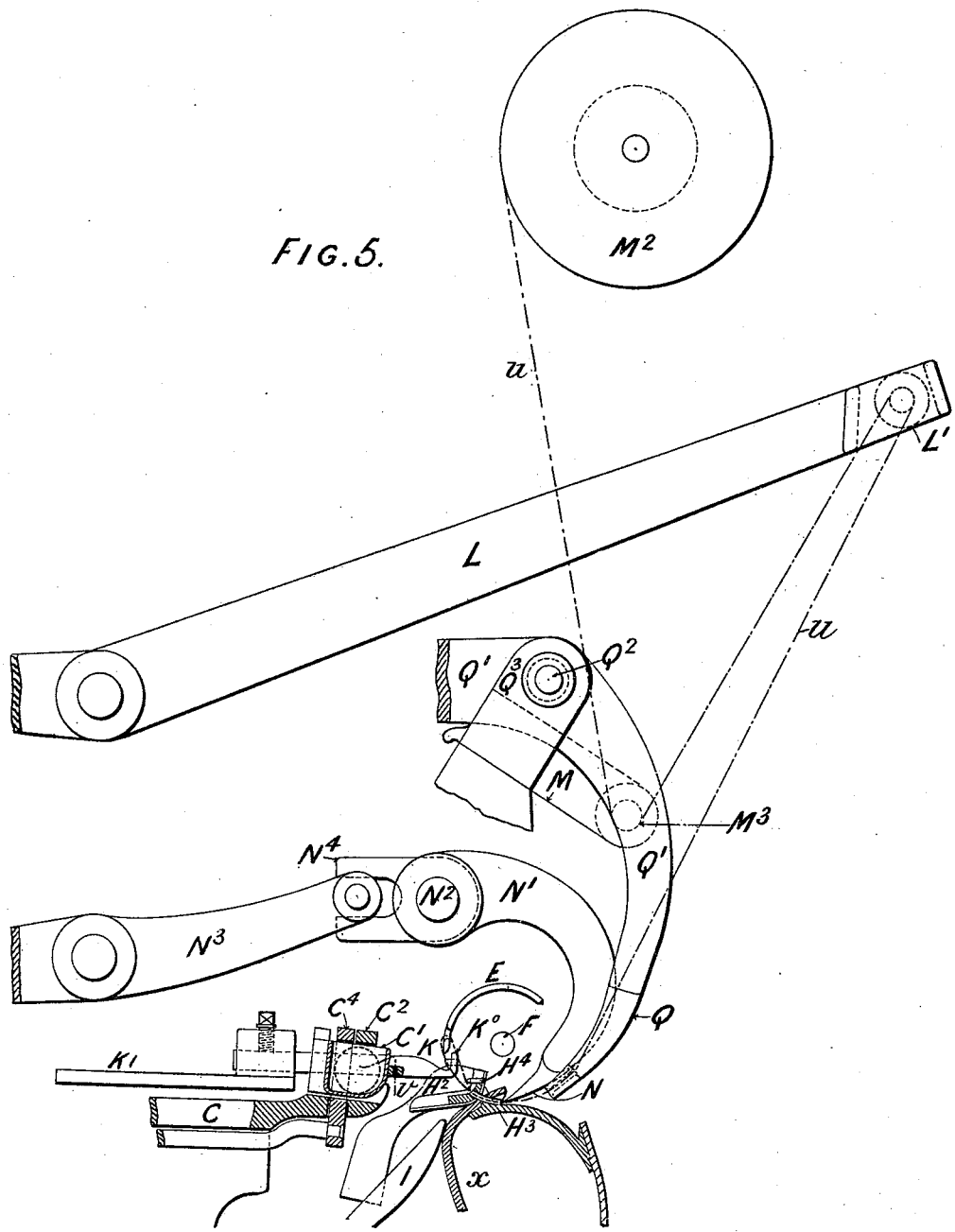
Fig. 5 shows the curved hooked needle E in its backward position having drawn the thread $u$ through the material $x$ and the hook K just entering the loop $u$ thereof, and by the aforesaid "dip" or slight advance of the needle E the hook K takes the loop out of the needle.
Figure 11:
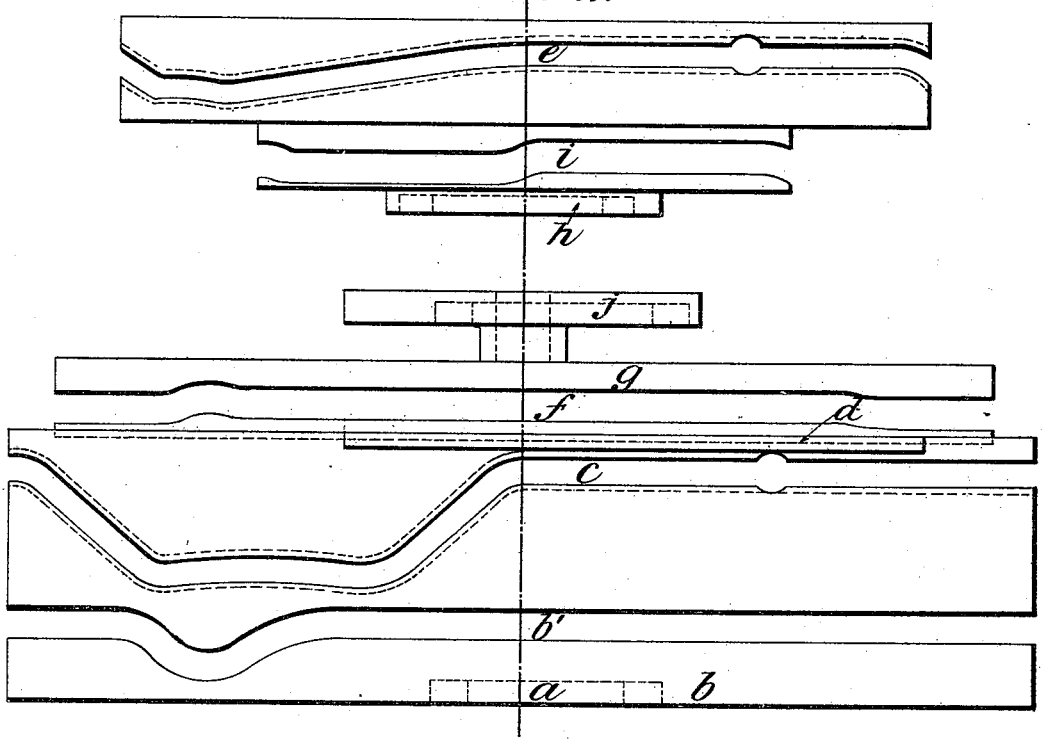

Fig. 11 shows the development of the actuating-cams. $a$ is the needle-cam; $b$ and $b'$, the looper-cams; $c$, the shuttle-cam; $d$, the cam for unlocking the boot-guide and the welt-guide; $e$, the cam for the reciprocating action of the hook K, and $f$ the cam for imparting lateral action thereto. $g$ is a cam on $f$ for easing the pressure-foot at the time of feeding; $h$, the cam for placing the pricker into the channel of the boot for feeding; $i$, the cam for giving the feeding motion to the pricker, and $j$ the stitch-tightening cam.

Figure 12:
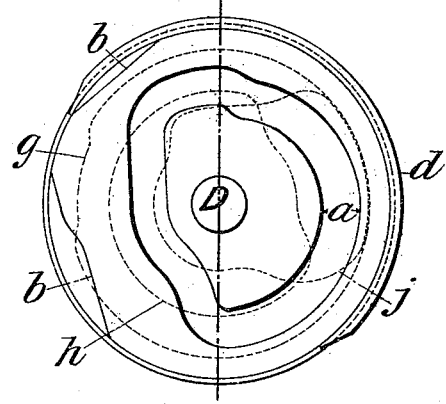

Fig. 12 is an end view of the cams. The various forms or paths on the face of each are shown by their center lines only. R is a pulley on the cam-shaft D, by which the machine may be driven by hand or power.

In the invention referred to in the before-named specification the radius of the curved needle named therein had to be sufficiently large to admit of the shuttle passing through or within the segment of the circle described by such curved needle, and although for certain classes of work the radius of said curved needle was suitable it was too large or the curve too flat for it to get close to the bottom of the channel, especially at the waist or narrow part of the sole of a boot under treatment. Now according to our present invention the curved hooked needle E is of smaller radius than heretofore, and the mechanism whereby the loop is transferred from the hooked needle to a position across the path of the shuttle C′ is placed in a horizontal position behind and outside of the radius of or the arc described by such hooked needle.

When sewing in the welt of welted boots through the upper leather to the insole, the latter of which may be of any description and either heavy or light, the boot requires to be lasted and prepared for the machine in a manner as nearly as can be similar to that required when the welt has to be sewed in by hand. The insole is beveled on the outer edge and flanged or grooved. The prepared parts are placed on or against the boot-guide I, which is mounted upon the slide I′, actuated in a forward direction by a spring $I^3$. The work is further guided by the welt-guide $H^2$, mounted upon the lever H. When the operator commences to sew, the welt being in its guide, he presses the lasted boot against the welt-guide and the boot-guide, which at the time are both unlocked. These move backward to such an extent as to permit of both the pressure-foot P and the feeding-pricker N taking into the groove or channel of the insole. The said slides are both locked while the needle E is making its backward stroke and the looped thread is being drawn across the path of the shuttle C′ and the latter passes through it. When the needle is passing through the welt, the upper, and the insole, the boot is backed up by the pressure-foot P. This is mounted freely upon an axis and takes into the channel or groove of the insole and forms a guide for the boot during the feeding thereof; but the said pressure-foot retires slightly just before the feeding takes place, so that it may proceed easily. When the needle has passed through the work, it is supplied by the looper Q with thread and makes its backward stroke, drawing the thread through the insole, the upper, and the welt, (or the material of a turn-shoe,) which thread has now become formed into a loop. During this operation the projecting "finger" H⁴ acts upon such loop so as to maintain it in a position for being farther drawn or transferred by the peculiarly-formed hook K to a position across the path of the shuttle and its race, so that the shuttle may pass through it and place the shuttle or locking-thread within the said loop. The peculiarly-formed hook K before referred to has a greater surface on its barb for the thread to glide over than that of the needle. It has a reciprocatory movement across and through the shuttle-race, and is so timed in its action that the loop on the needle is at once entered by the now-advancing hook. In addition to its advancing movement the hook also has a lateral movement, during which it passes round or behind the point of the needle and at the inside of its curve. After these movements have taken place the needle makes a slight advance or dip, and the loop becomes stripped therefrom and left upon the hook, which is provided with a projecting pin or fence for preventing the loop from passing around the shank or neck thereof and for facilitating its stripping therefrom at the required moment. Then by the retirement of the said hook with the loop thereon the loop becomes elongated and drawn across the shuttle-race, Fig. 6. The slides of the loop are sufficiently separated to allow the shuttle to enter and pass through it, and immediately it has passed through its motion is arrested. The shuttle-driver then makes a slight retrograde movement, thus leaving a space between itself and the rear end of the shuttle. At this moment the aforesaid hook makes a lateral movement and causes the loop to strike against the finger C⁵, attached to the shuttle-driver. By this means the loop becomes stripped from the hook and passes between the rear of the shuttle and its driver, after which the stitch is tightened by means of a tightening device, such as or similar to that described in our former specification before referred to. The advancement or feeding of the boot for the succeeding stitches is effected by means of the "pricker" N taking into the channel of the insole. This pricker is firmly fixed upon the same axis that carries the pressure-foot and has a lateral movement imparted thereto immediately after the tightening of a stitch. These movements complete the cycle of the sewing operation and the feeding, after which the said pricker retires so far out of the way as to allow the looper to again place the thread into the barb or hook of the needle for another stitch. In disengaging the loop of thread from the hooked needle by means of the reciprocating hook and then carrying it across the path of the shuttle, as described, all strain is removed from the needle and transferred to the hook while bringing the loop into position to be entered by the point of the shuttle.

We are aware that in a machine of this class a loop-retractor has been employed to enter the loop of thread drawn up through the material by the hooked needle, the retractor and needle thereafter being moved away from each other to spread and carry the loop into the path of the shuttle-hook, the loop being finally removed from the needle by the onward rotary movement of the shuttle-hook after entering the loop, and such construction we do not claim.

What we claim is—

1. In a sole-sewing machine, the following instrumentalities, viz: a curved hooked needle, a looper to supply a thread to the said needle, a horizontally-curvilinear shuttle-race located behind and outside of the curved path described by said needle, a shuttle arranged to reciprocate in said race, a hook adapted in its movements not only to reciprocate across and beyond said race to enter and disengage a loop of thread from the needle, but also to carry the said loop of thread across said raceway and open and spread the same in front of and in the path of said shuttle near its point, and means, substantially as described, for actuating said needle, shuttle, and hook, as and for the purposes set forth.

2. In a sewing-machine, the combination, with a curved hooked needle having a vibrating circular motion, a looper for engaging one of the threads with said hooked needle, and feeding mechanism, of a shuttle-race located behind and outside of the circular path of said needle, a shuttle, a shuttle-driver and means for operating the same, a stripper-finger carried by said shuttle-driver, and a hook having both a reciprocating motion across said race and a lateral motion, substantially as herein described, for the purposes specified.

3. In a sewing-machine, the combination, with a curved hooked needle having a vibratory circular motion, a looper to engage one of the threads with said hooked needle, and feeding mechanism, of a shuttle-race located behind and outside of the path of said needle, a shuttle capable of reciprocating in said race, and a hook having a reciprocating motion across said race and also a lateral motion, said hook having a projecting pin or fence K⁰, substantially as herein described, for the purpose set forth.

4. In a sewing-machine, the combination of a curved hooked needle E, mounted to vibrate about an axis above the work-holder, a looper adapted to engage one of the threads with said hooked needle, feeding mechanism, a shuttle-race located behind said needle, a shuttle, a reciprocating shuttle-driver C⁴, with stripping-finger C⁵, a hook K, carried by a reciprocating slide K', a pivoted frame wherein said slide works, and means for operating said slide and frame, substantially as herein described, for the purpose set forth.

5. In a sewing-machine, the combination of a curved hooked needle E, a looper adapted to engage one of the threads with said needle, a shuttle arranged to reciprocate in a horizontal plane, a shuttle-driver, a reciprocating hook adapted to remove a loop of thread from said hook and then to carry it across the shuttle-race and into the path of said shuttle, a stitch-tightening device, a feeding-pricker N, carried by a lever N′, mounted on a shaft capable of endwise motion, a pressure-foot P, carried by and operated from a lever P′ on said shaft, means, substantially as described, for operating said levers N′ and P′ and for imparting endwise movements to said shaft, and a work holder or support, substantially as herein described, for the purposes set forth.

6. In a sewing-machine, the combination, with a curved hooked needle, a looper, a work-holder, a feeding-pricker and pressure-foot having a lateral movement, and a thread-tightening device, of a curvilinear shuttle-race C, arranged behind and outside the curved path of the needle, a shuttle C′, a shuttle-driver $C^4$ for reciprocating said shuttle in said race, a stripping-finger $C^5$, carried by said shuttle-driver, a hook K, having a projecting pin or fence $K^0$, a slide K′ for reciprocating said hook across said shuttle-race, and a pivoted frame $K^3$, in which said slide works and by which a lateral movement can be imparted to said hook at the required times, the whole combined and operating substantially as herein described, for the purposes specified.

JOHN WILLIAM RAMSDEN.
HARRY SENIOR ELLIS.

In presence of—
THOS. E. CRAVEN,
*Fel. Inst. P. A.*, 24 *Victoria Chambers, Leeds.*
WILLIAM SADLER,
31 *Livingstone Terrace, Leeds.*